(12) United States Patent
Fisher (10) Patent No.: US 11,577,853 B2
(45) Date of Patent: Feb. 14, 2023

(54) AIRCRAFT ANGLE OF ATTACK AND SIDESLIP ANGLE INDICATOR

(71) Applicant: William M. Fisher, Edgerton, WI (US)

(72) Inventor: William M. Fisher, Edgerton, WI (US)

(73) Assignee: William M. Fisher, Edgerton, WI (US)

( * ) Notice: Subject to any disclaimer, the term of this patent is extended or adjusted under 35 U.S.C. 154(b) by 140 days.

(21) Appl. No.: 17/228,825

(22) Filed: Apr. 13, 2021

(65) Prior Publication Data
US 2022/0324585 A1    Oct. 13, 2022

(51) Int. Cl.
| | | |
|---|---|---|
| *B64D 43/00* | (2006.01) | |
| *G01P 13/02* | (2006.01) | |
| *G01C 23/00* | (2006.01) | |
| *G08G 5/00* | (2006.01) | |

(52) U.S. Cl.
CPC ............ *B64D 43/00* (2013.01); *G01P 13/025* (2013.01); *G08G 5/0047* (2013.01); *G01C 23/00* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08; G01C 23/005; G01C 21/16; G01C 5/06; G01C 13/006; G01C 23/00; G01C 21/005; G01C 13/008; G01C 15/002; G01C 9/34; G01C 21/185; G01C 9/00
USPC ...................................................... 73/170.02
See application file for complete search history.

(56) References Cited

U.S. PATENT DOCUMENTS

| | | |
|---|---|---|
| 3,930,610 A | 1/1976 | Hache |
| 3,978,724 A | 9/1976 | Freeman |
| 4,027,533 A | 6/1977 | Pretto |
| 4,046,341 A | 9/1977 | Quinlivan |
| 4,096,744 A | 6/1978 | De Leo et al. |

(Continued)

OTHER PUBLICATIONS

The Aviation Consumer, Dec. 2020, vol. LII, No. 12, pp. 4-7 and 32.

*Primary Examiner* — Andre J Allen
(74) *Attorney, Agent, or Firm* — Craig Fieschko; DeWitt LLP (57) ABSTRACT

An aircraft angle of attack and sideslip angle indicator includes a display responsive to angle of attack and sideslip angle measurements from an angle of attack sensor and a sideslip angle sensor on an aircraft. The display depicts angle of attack along a first (preferably vertical) axis, and sideslip angle along a second (preferably horizontal) axis, with the axes intersecting at a display datum which represents acceptable angle of attack and sideslip angle values from the aircraft. The display depicts the aircraft's current angle of attack and sideslip angle with respect to the display datum, thereby indicating to the pilot whether non-optimal (and perhaps dangerous) flight conditions are occurring.

18 Claims, 4 Drawing Sheets

(56) References Cited

U.S. PATENT DOCUMENTS

| | | |
|---|---|---|
| 4,230,290 A | 10/1980 | Townsend et al. |
| 4,378,696 A | 4/1983 | DeLeo et al. |
| 4,390,950 A | 6/1983 | Muller |
| 4,468,961 A | 9/1984 | Berg |
| 4,669,303 A | 6/1987 | Henry |
| 4,776,542 A | 10/1988 | Van Dam |
| 4,814,764 A | 3/1989 | Middleton |
| 5,083,279 A | 1/1992 | Burdoin |
| 5,089,968 A | 2/1992 | Orgun et al. |
| 5,115,237 A | 5/1992 | Greene |
| 5,438,865 A | 8/1995 | Greene |
| 5,595,357 A | 1/1997 | Catlin et al. |
| 6,227,918 B1 | 5/2001 | Wharton |
| 6,342,846 B1 | 1/2002 | Argentieri |
| 6,702,229 B2 | 3/2004 | Anderson et al. |
| 6,941,805 B2 | 9/2005 | Seidel et al. |
| 7,043,345 B2 | 5/2006 | Warkomski et al. |
| 7,377,159 B2 | 5/2008 | Thomas |
| 8,718,840 B2 | 5/2014 | Spoerry et al. |
| D731,333 S | 6/2015 | Hawkins et al. |
| 9,193,473 B2 | 11/2015 | Barth et al. |
| 9,221,550 B2 | 12/2015 | Hedrick et al. |
| 9,233,761 B2 | 1/2016 | Yamasaki |
| 9,703,293 B2 | 7/2017 | Leopold et al. |
| 9,910,058 B2 | 3/2018 | Ruffino |
| 9,981,753 B2 | 5/2018 | Hedrick |
| 9,983,023 B2 | 5/2018 | Genito et al. |
| 10,048,288 B2 | 8/2018 | Benning |
| 10,180,077 B2 | 1/2019 | Waddington |
| 10,281,303 B2 | 5/2019 | Johnson et al. |
| 10,393,766 B2 | 8/2019 | Alcaya et al. |
| 10,453,234 B2 * | 10/2019 | Baron .................. G09G 5/005 |
| 10,725,065 B2 | 7/2020 | Krueger et al. |
| 10,782,146 B2 | 9/2020 | Genito et al. |
| 10,803,085 B1 | 10/2020 | Watson |
| 10,884,017 B2 | 1/2021 | Ell |
| 2012/0299753 A1 * | 11/2012 | Thoreen ............... G01C 23/005 340/975 |

* cited by examiner

AIRCRAFT ANGLE OF ATTACK AND SIDESLIP ANGLE INDICATOR

FIELD OF THE INVENTION

This document concerns an invention relating generally to avionics sensors and displays, and more specifically to sensors and displays for determining the angle of attack and sideslip angle of fixed-wing aircraft.

BACKGROUND OF THE INVENTION

Fixed-wing aircraft can experience stall, a condition where the aircraft's angle of attack exceeds a critical angle beyond which the aircraft's wings experience decreasing (or no) lift. The term "angle of attack" refers to the angle between a reference line on the aircraft's wings—typically a chord line extending between wing tip and wing tail—and the direction of the oncoming air encountered by the wing, i.e., the aircraft's trajectory. Angle of attack can also be regarded as the angle between the aircraft's pitch, i.e., the angle of its nose-to-tail longitudinal axis versus horizontal, and its trajectory. When stall occurs, the aircraft drops, and typically experiences some degree of loss of control. This can lead to crashes, particularly if the aircraft is at such low altitude that it cannot overcome stall prior to ground impact.

Spin—that is, rolling of the aircraft about its vertical and longitudinal axis—is another dangerous condition, and can be particularly troublesome because it can be difficult to regain control of a spinning aircraft regardless of its altitude. Spin can be caused by a variety of conditions. Stall spin can occur when the aircraft's rudder is applied to accomplish a turn, and the aircraft is close to stall speed (the speed at which the aircraft must travel for its wings to generate lift). The turn generated by the rudder increases the relative speed of the wing on the outside of the turn (thereby increasing its lift) and decreases the speed of the wing on the inside of the turn (thereby decreasing its lift), such that the slower inside wing stalls, causing the aircraft to descend rapidly while rolling about its vertical and longitudinal axis.

Spin can also occur when an aircraft is near stall speed and has excessive sideslip, i.e., an excessive angle between the aircraft's longitudinal axis and an axis defining the aircraft's trajectory. The sideslip can arise from any one or more of aerodynamic conditions (such as rudder and/or aileron application), thrust conditions (such as an engine on one wing having lower power than an engine on an opposite wing), or atmospheric conditions (such as turbulence acting on one wing). Here too one wing can stall before the other, causing a spin. Sideslip can be addressed by applying the aircraft's rudder, but if the aircraft drops below its minimum controllable airspeed (often referred to as Velocity Minimum Control or Vmc, the speed below which the rudder stalls and becomes ineffective for sideslip correction), sideslip can increase to the point where one wing stalls, causing a spin referred to as a "Vmc roll." A Vmc roll is particularly dangerous because it tends to occur at low speed, typically on landing approach or shortly after takeoff, where the aircraft is too close to the ground to recover.

Aircraft are often equipped with angle-of-attack (AoA) indicators—in essence, lift indicators—to help their operators avoid approaching (and especially exceeding) the critical angle of attack. These AoA indicators receive signals from AoA sensors, and provide visual, tactile, audio, and/or other feedback to a pilot to indicate when the critical angle of attack is approached or exceeded, thereby helping a pilot avoid stall. AoA sensors may take a variety of forms and may operate using different principles, with common AoA sensors including:

(1) Vane sensors, which utilize movable members whose orientation determines he measured angle of attack. As an example, an angle of attack (AoA) vane, sometimes referred to as an "alpha vane," is a rotatable plate which is typically mounted to the fuselage to protrude in a manner similar to a wing. The vane rotates to orient itself parallel to the direction of oncoming airflow, and this orientation is measured (and compared to the chord or other reference line on the wing(s)) to provide an indication of angle of attack.

(2) Pressure sensors, which use air pressure measurements to determine angle of attack. As an example, differential pressure sensors use orifices oriented at different angles within a vertical plane, with the orifices typically being at the end of a tube or cone protruding forwardly from the aircraft's nose or from a wing. The angle of attack is determined from pressure differences between the orifices.

Some AoA sensors can be regarded as both vane sensors and pressure sensors. As an example, a null-seeking pressure sensor uses a rotatable member having orifices similar to those in differential pressure sensors. A mechanism rotates the member until the pressure difference between the orifices reaches zero, and the orientation of the member is then used to define the angle of attack.

Some aircraft also have yaw rate sensors which provide measurements of the aircraft's rate of turning about its vertical axis, typically via use of an accelerometer or gyroscope, though they do not provide measurements of the degree of sideslip itself. It is useful for a pilot to know the degree of an aircraft's sideslip, as excessive sideslip can greatly reduce aerodynamic efficiency and the climbing capability of an aircraft, posing problems when rapid ascent is needed (e.g., at takeoff). Additionally, knowledge of an aircraft's sideslip can help avoid Vmc roll and maximize climb, cruise, and drift-down performance. Knowledge of sideslip can also help a pilot of a multi-engine aircraft identify engine issues, as failure of an engine on one side of the aircraft typically causes sideslip.

SUMMARY OF THE INVENTION

The invention, which is defined by the claims set forth at the end of this document, is directed to an aircraft angle of attack and sideslip angle indicator which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Figure 1:
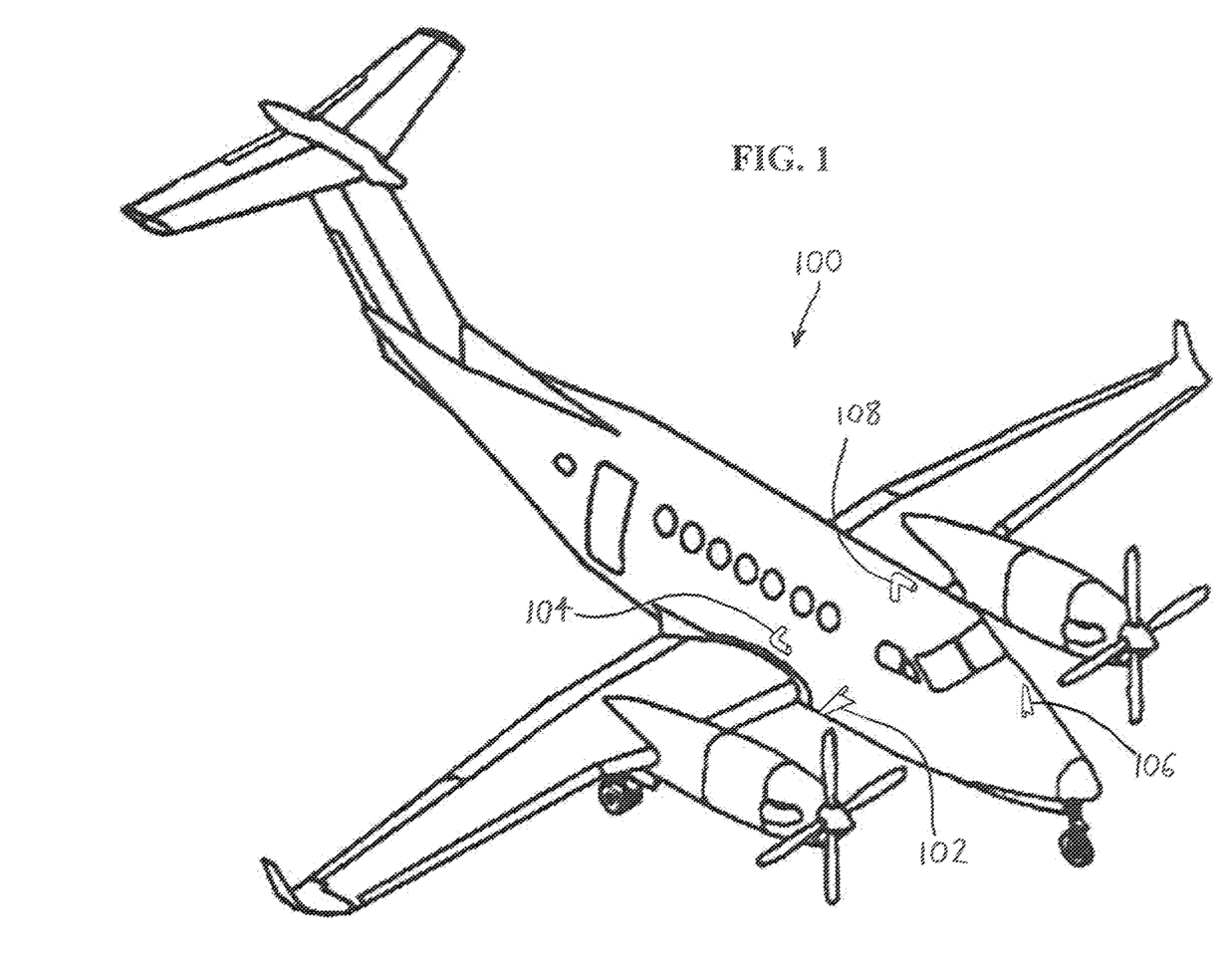
FIG. 1 depicts an exemplary aircraft 100 (more particularly, a fixed-wing airplane) bearing exemplary angle of attack sensors 102 and 104, and sideslip sensors 106 and 108.
Figure 2A:
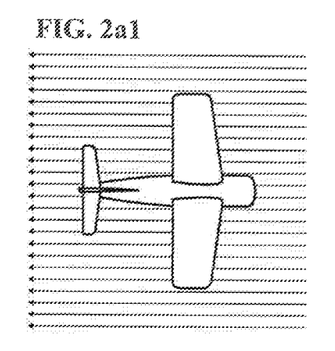
Figure 2B:
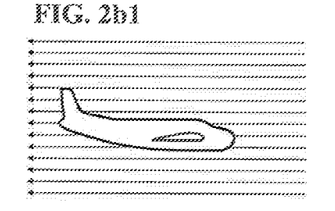
Figure 3A:
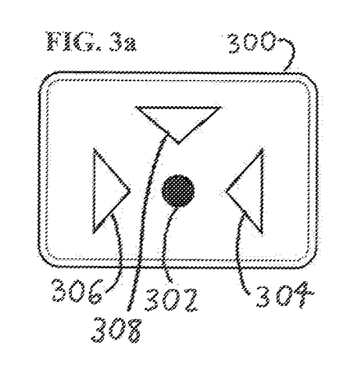
FIGS. 3*a*-3*d* (hereinafter collectively referred to as FIG. 3) depict an exemplary display 300 in accordance with the invention, with the appearance of the display 300 changing in correspondence with the aircraft flight orientations of FIGS. 2*a*1-2*a*4 and FIGS. 2*b*1-2*b*4 above.

An exemplary version of the aircraft angle of attack and sideslip indicator includes a display 300 as depicted in FIGS. 3a-3d, which changes its appearance in accordance with the angle of attack and sideslip angle of an aircraft (with an exemplary aircraft 100 being depicted in FIG. 1). The display 300 visually depicts the angle of attack of the aircraft along a pitch axis (here a vertical axis), and visually depicts the sideslip angle of the aircraft along a sideslip axis (here a horizontal axis), with the axes intersecting at a display datum 302. Thus:

When the aircraft 100 is flying with an acceptable angle of attack (one safely below the critical angle of attack, e.g., below 60% of the critical angle of attack, as represented by FIG. 2*b*1), and with no or minimal sideslip (as represented by FIG. 2*a*1), the display 300 might illuminate the display datum 302 as seen in FIG. 3*a*.

Figure 3B:
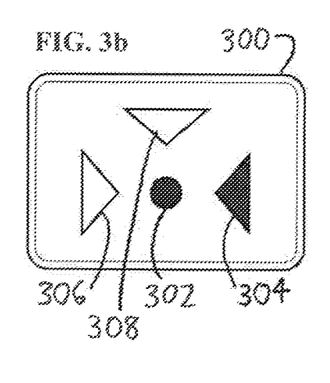

When the aircraft 100 is flying with an acceptable angle of attack (as represented by FIG. 2*b*2) and with at least some predefined degree of leftward sideslip (as represented by FIG. 2*a*2), the appearance of the display 300 changes along the sideslip axis as seen in FIG. 3*b*, illuminating a left sideslip region 304 to the right of the display datum 302 to indicate that right rudder should be applied to remedy the sideslip.

Figure 2A:
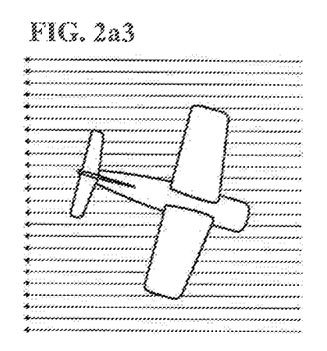
Figure 2A:
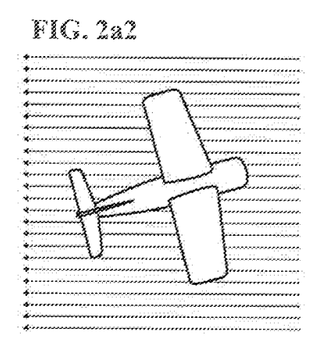
Figure 2B:
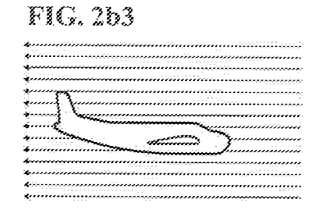
Figure 2B:
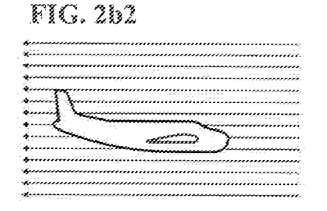
Figure 3C:
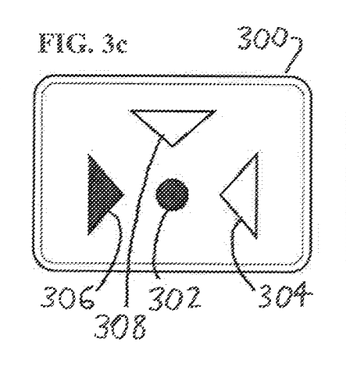

Conversely, when the aircraft 100 is flying with an acceptable angle of attack (as represented by FIG. 2*b*3) and with at least some predefined degree of rightward sideslip (as represented by FIG. 2*a*3), the appearance of the display 300 changes along the sideslip axis as seen in FIG. 3*c*, illuminating a right sideslip region 306 to the left of the display datum 302 to indicate that left rudder should be applied to remedy the sideslip.

Figure 2A:
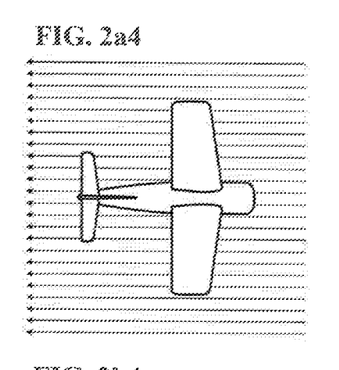
Figure 2B:
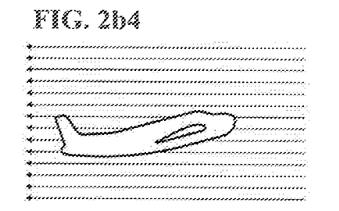
Figure 3D:
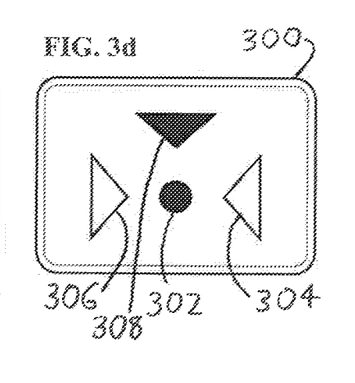

When the aircraft 100 is flying with an angle of attack that unacceptably approaches the critical angle (as represented by FIG. 2*b*4) and with no sideslip (as represented by FIG. 2*a*4), the appearance of the display 300 changes along the pitch axis as seen in FIG. 3*d*, illuminating a pitch region 308 above the display datum 302 to indicate that the elevator control should be pushed forward to decrease the angle of attack to a safer level.

The appearance of the display 300 therefore changes along the display's pitch (vertical) axis in dependence on the aircraft's angle of attack, and changes along the display's sideslip (horizontal) axis in dependence on the aircraft's sideslip. More particularly, the display's appearance changes along the pitch/vertical axis in dependence on an aircraft angle of attack signal generated by an angle of attack sensor provided on the aircraft 100 (e.g., the vane sensor 102 of FIG. 1), and the display's appearance changes along the sideslip/horizontal axis in dependence on an aircraft sideslip signal generated by a sideslip sensor provided on the aircraft 100 (e.g., the vane sensor 106 of FIG. 1). The display therefore provides intuitive feedback to a pilot regarding the aircraft's angle of attack and sideslip angle, thereby better allowing the pilot to compensate for potentially dangerous conditions, and allowing a pilot to more readily identify a failed engine on a multi-engine aircraft. This feedback is particularly useful in emergency situations, as knowledge of the aircraft's angle of attack and sideslip angle can allow a pilot to maintain maximum climb capability while avoiding dangerous stall/spins and Vmc rolls. The display allows a pilot to readily adjust controls for zero side-slip (lowest drag conditions) about the aircraft's vertical axis, and optimum angle of attack about the aircraft's pitch axis, in a single clear and concise display atop the pilot's glare shield (or other conveniently-viewed location).

Further potential advantages, features, and objectives of the invention will be apparent from the remainder of this document in conjunction with the associated drawings.

BRIEF DESCRIPTION OF THE DRAWINGS

FIGS. 2*a*1-2*b*4 (hereinafter collectively referred to as FIG. 2) schematically illustrate various orientations of the aircraft 100 in flight, with arrows illustrating the direction of oncoming air, and with FIGS. 2*a*1-2*a*4 illustrating top views of the aircraft 100 and FIGS. 2*b*1-2*b*4 illustrating corresponding side views.

FIGS. 4*a*1-4*b*4 (hereinafter collectively referred to as FIG. 4), like FIG. 2, schematically illustrate various orientations of the aircraft 100 in flight, with arrows illustrating the direction of oncoming air, and with FIGS. 4*a*1-4*a*4 illustrating top views of the aircraft 100 and FIGS. 4*b*1-4*b*4 illustrating corresponding side views.

FIGS. 7*a*1-7*b*4 (hereinafter collectively referred to as FIG. 7), like FIGS. 2 and 4, schematically illustrate various orientations of the aircraft 100 in flight, with arrows illustrating the direction of oncoming air, and with FIGS. 7*a*1-7*a*4 illustrating top views of the aircraft 100 and FIGS. 7*b*1-7*b*4 illustrating corresponding side views.

DETAILED DESCRIPTION OF EXEMPLARY VERSIONS OF THE INVENTION

Expanding on the discussion above, FIG. 1 illustrates an exemplary aircraft 100 having exemplary angle of attack (AoA) sensors 102 and 104 and exemplary sideslip sensors 106 and 108, all of which are shown in simplified form, and highly enlarged with respect to the aircraft 100. An AoA sensor can take the form of a vane sensor (as with AoA sensor 102), a pressure sensor (as with AoA sensor 104), or another known AoA sensor. Likewise, a sideslip sensor can take the form of a vane sensor (as with sideslip sensor 106), a pressure sensor (as with sideslip sensor 108), or another known AoA sensor which is adapted to determine the direction of airflow along the plane's trajectory, but oriented at right angles to the axis about which the angle of attack is oriented. In other words, whereas an AoA sensor can be regarded as determining the direction of airflow with respect to the plane of the aircraft's wings, a sideslip sensor can be regarded as determining the direction of airflow with respect to the vertical plane along the aircraft's longitudinal axis (e.g., with respect to the plane of the aircraft's vertical stabilizer, if it has one). Thus, for example, an AoA sensor could be a vane sensor (such as 102) which pivots about a lateral (wing-to-wing) axis through orientations which vary with respect to a plane oriented parallel to the aircraft's wings, whereas a sideslip sensor could be a vane sensor (such as 106) which pivots about a vertical axis though orientations which vary with respect to a vertical plane along the aircraft's longitudinal axis.

It should be understood that the types and positions of the angle of attack (AoA) sensors 102 and 104 and sideslip sensors 106 and 108 depicted in FIG. 1 are merely exemplary, and other types of sensors may be used, and the sensors may be situated elsewhere on the aircraft 100. Additionally, the invention might use only a single AoA sensor (e.g., either a vane sensor or a pressure sensor rather than both types of sensors), and similarly might use only a single sideslip sensor. Alternatively, the invention might use any number of one or more types of AoA sensors (with their angle of attack signals being averaged or otherwise combined), and similarly might use any number of one or more types of sideslip sensors. Moreover, depending on sensor configuration, a sensor might serve as both an AoA sensor and a sideslip sensor; for example, a pressure sensor might bear vertically-arrayed orifices allowing determination of angle of attack, as well as horizontally-arrayed orifices allowing determination of sideslip angle.

FIGS. 3, 5, 6, and 8-10 then show a variety of exemplary displays 300, 500, 600, 800, 900, and 1000 as they might appear within the cockpit of the aircraft 100 during the angle of attack and sideslip conditions seen in FIGS. 2, 4, and 7. The display may be provided as any common display, e.g., a liquid crystal display (LCD), organic light emitting diode display (OLED), inorganic light emitting diode display (LED), plasma display panel (PDP), or electrophoretic display, or may be simply provided as a surface having lamps thereon, with the lamps arrayed such that they provide the functions described herein when illuminated (or deenergized). The display may be installed within the dashboard of the aircraft 100, or may be provided as a stand-alone unit which can be removably or otherwise mounted upon the dashboard.

The invention will now be described in greater detail with reference to the exemplary display 500 of FIG. 5, though it should be understood that this description generally applies to the exemplary displays 300, 600, 800, 900, and 1000 of FIGS. 3, 6, and 8-10 as well. In the display 500 of FIG. 5, the pitch axis (here the vertical axis) and the sideslip axis (here the horizontal axis) intersect at a display datum 502 representative of a state wherein the aircraft 100 has a datum angle of attack and a datum sideslip angle, that is, a "safe" angle of attack or range of angles of attack (such as the angle of attack when the aircraft 100 is cruising, or a range of angles of attack about this cruising angle), and an optimal sideslip angle or range of sideslip angles (such as zero sideslip angle, or within a few degrees of zero sideslip angle). A pitch region 508 extends upwardly from the display datum 502, with the pitch region 508 representing states wherein the aircraft's angle of attack is greater than the datum angle of attack. Likewise, a sideslip region, including a left sideslip region 504 and a right sideslip region 506, extends laterally from the display datum 502. The left sideslip region 504 is situated to the right of the display datum 502, with the left sideslip region 504 representing a state wherein the aircraft's sideslip angle is leftward versus the datum sideslip angle (i.e., the aircraft's nose is situated leftwardly, and the aircraft's tail is situated rightwardly, versus the datum sideslip angle, as exemplified by FIGS. 2a2, 4a2, and 7a2). Conversely, the right sideslip region 506 is situated to the left of the display datum 502, with the right sideslip region 506 representing a state wherein the aircraft's sideslip angle is rightward versus the datum sideslip angle (i.e., the aircraft's nose is situated rightwardly, and the aircraft's tail is situated leftwardly, versus the datum sideslip angle, as exemplified by FIGS. 2a3, 4a3, and 7a3).

Figure 4A:
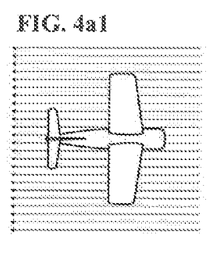
Figure 4A:
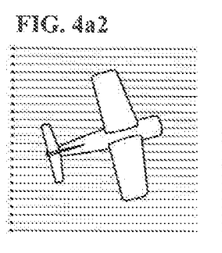
Figure 4A:
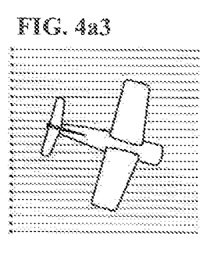
Figure 4A:
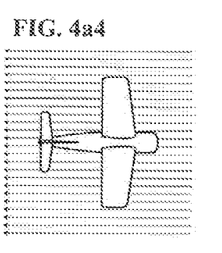
Figure 4B:
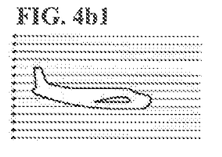

Each region 504, 506, and 508 includes a series of discrete indicia. Each indicium in the pitch region 508 represents a range of angles of attack of the aircraft 100, wherein each successive indicium following the display datum 502 in the series along the pitch axis corresponds to a successively greater range of angles of attack of the aircraft 100 than the range represented by the prior indicium in the series. Likewise, each indicium in the sideslip region represents a range of sideslip angles of the aircraft 100, with each successive indicium following the display datum 502 in the series along the sideslip axis corresponding to a successively greater range of sideslip angles of the aircraft 100 than the range represented by the prior indicium in the series. Each indicium changes appearance upon the aircraft's attaining an angle of attack and/or a sideslip angle within the indicium's range of angles of attack and/or its range of sideslip angles. Thus, when the aircraft's angle of attack and sideslip angle both have values within acceptable ranges (as exemplified by FIGS. 4a1 and 4b1, such acceptable ranges being predefined within a processor associated with the display 500), the display datum 502 is illuminated or otherwise visually differentiated from the remainder of the display 500, as in FIG. 5a.

Figure 4B:
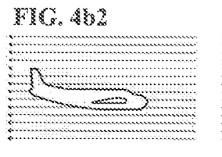
Figure 5A:
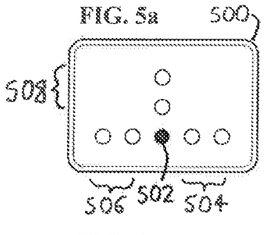
FIGS. 5*a*-5*d* (hereinafter collectively referred to as FIG. 5) depict a second exemplary display 500 in accordance with the invention, with the appearance of the display 500 changing in correspondence with the aircraft flight orientations of FIGS. 4*a*1-4*a*4 and FIGS. 4*b*1-4*b*4 above.
Figure 5B:
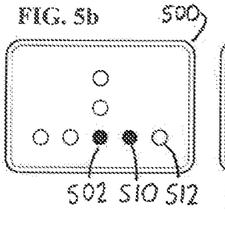

When the aircraft's angle of attack is within an acceptable range but the aircraft 100 begins to experience potentially problematic leftward sideslip (as exemplified by FIGS. 4a2 and 4b2, e.g., a sideslip angle of 2 degrees or more), the first indicium 510 to the right of the display datum 502 similarly changes its appearance as in FIG. 5b, indicating that the aircraft's rudder can be moved rightwardly to return the aircraft 100 to the acceptable sideslip angle range. If the aircraft 100 thereafter experiences further leftward sideslip exceeding the range represented by the first indicium 510 (e.g., greater than 5 degrees), the second indicium 512 from the display datum 502 could also change its appearance. Subsequent indicia will thereafter change their appearance as the sideslip angle range for the prior indicium is exceeded. Conversely, each indicium preferably reverts to its original appearance once the aircraft's leftward sideslip drops to a level below the range of sideslip angles represented by the indicium.

Figure 4B:
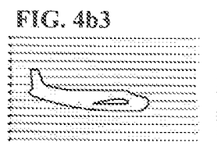
Figure 5C:
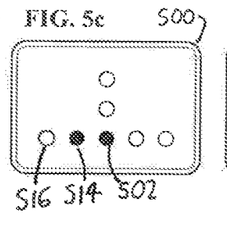

Similar changes in the appearance of the display 500 occur if the aircraft 100 experiences rightward sideslip, as in FIGS. 4a3 and 4b3: the first indicium 514 to the left of the display datum 502 changes appearance as in FIG. 5c once the aircraft's sideslip angle exceeds the acceptable range defined for the display datum 502. If the rightward sideslip thereafter exceeds the range represented by the first indicium 514, the second indicium 516 to the left of the display datum 502 also changes appearance.

Figure 4B:
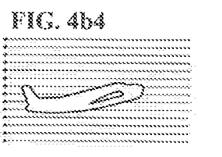
Figure 5D:
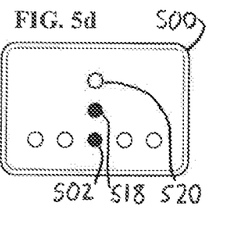
Figure 6A:
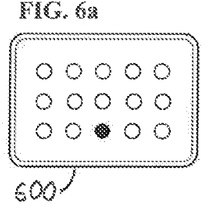
FIGS. 6*a*-6*d* (hereinafter collectively referred to as FIG. 6) depict a third exemplary display 600 in accordance with the invention, with the appearance of the display 600 changing in correspondence with the aircraft flight orientations of FIGS. 4*a*1-4*a*4 and FIGS. 4*b*1-4*b*4 above.
Figure 6B:
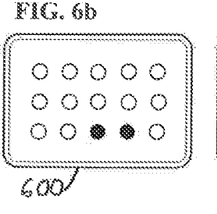
Figure 6C:
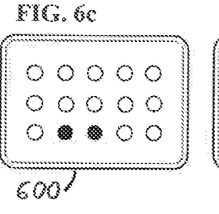
Figure 6D:
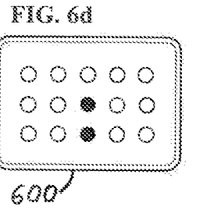
Figure 7A:
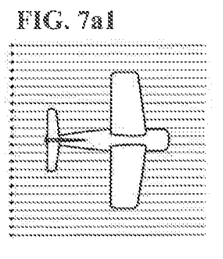
Figure 7A:
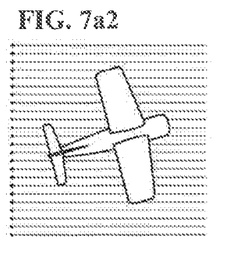
Figure 7A:
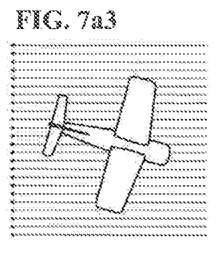
Figure 7A:
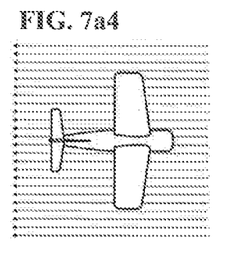
Figure 7B:
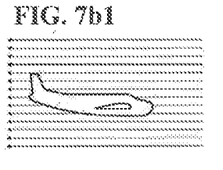
Figure 7B:
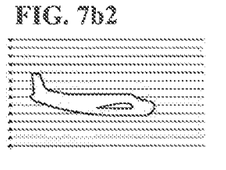
Figure 7B:
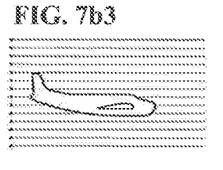
Figure 7B:
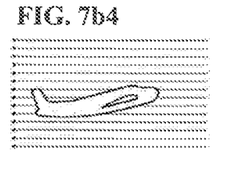
Figure 8A:
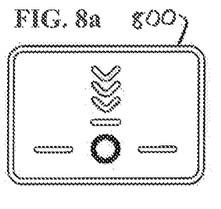
FIGS. 8*a*-8*d* (hereinafter collectively referred to as FIG. 8) depict a fourth exemplary display 800 in accordance with the invention, with the appearance of the display 800 changing in correspondence with the aircraft flight orientations of FIGS. 7*a*1-7*a*4 and FIGS. 7*b*1-7*b*4 above.
Figure 8B:
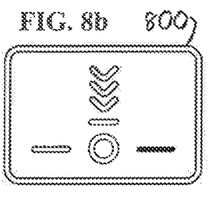
Figure 8C:
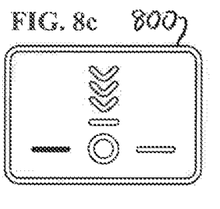
Figure 8D:
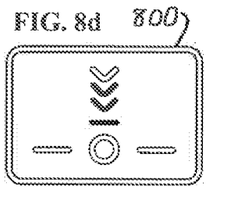
Figure 9A:
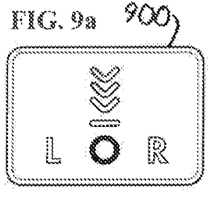
FIGS. 9*a*-9*d* (hereinafter collectively referred to as FIG. 9) depict a fifth exemplary display 900 in accordance with the invention, with the appearance of the display 900 changing in correspondence with the aircraft flight orientations of FIGS. 7*a*1-7*a*4 and FIGS. 7*b*1-7*b*4 above.
Figure 9B:
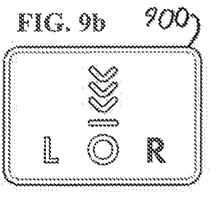
Figure 9C:
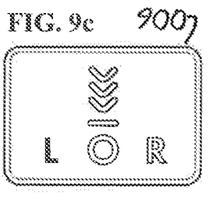
Figure 9D:
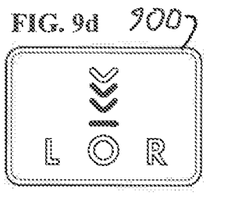
Figure 10A:
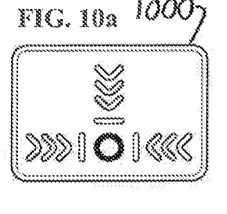
FIGS. 10*a*-10*d* (hereinafter collectively referred to as FIG. 10) depict a third exemplary display 1000 in accordance with the invention, with the appearance of the display 1000 changing in correspondence with the aircraft flight orientations of FIGS. 7*a*1-7*a*4 and FIGS. 7*b*1-7*b*4 above.
Figure 10B:
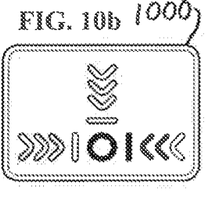
Figure 10C:
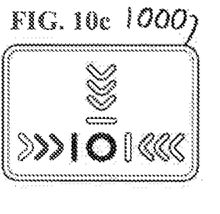
Figure 10D:
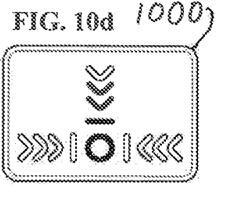

Finally, when the aircraft's sideslip angle is within an acceptable range but the aircraft 100 begins to approach the angle of attack (e.g., when the aircraft 100 exceeds 60% of the critical angle of attack), as exemplified by FIGS. 4a4 and 4b4, the first indicium 518 above the display datum 502 changes its appearance, as in FIG. 5d. The second indicium 520 above the display datum 502 would similarly change its appearance when the aircraft's angle of attack exceeds the range represented by the first indicium 518 (e.g., when the aircraft 100 exceeds 80% of the critical angle of attack), warning the pilot of potential stall.

Combinations of the foregoing arrangements are also possible. For example, if an aircraft 100 has leftward sideslip as in FIG. 4a2 and also approaches the critical angle of attack as in FIG. 4b4, one or more indicia 510, 512, etc. to the right of the display datum 502 might change appearance, and additionally one or more indicia 518, 520, etc. above the display datum 502 might change appearance (with the changed indicia having angle of attack and sideslip angle ranges encompassing the aircraft's angle of attack and sideslip angle as defined by the angle of attack and sideslip sensors). The display 500 therefore warns the pilot of approaching the stall point of the aircraft 100 in both the pitch and sideslip directions.

FIG. 6 then illustrates a display 600 resembling that of FIG. 5, but having additional indicia arrayed about the pitch axis and above the sideslip axis. The indicia change appearance on and about the pitch axis in accordance with the magnitude of the aircraft's sideslip angle, as well as changing appearance on and above the sideslip axis in accordance with the magnitude of the aircraft's angle of attack. Whereas FIG. 5 depicts the aircraft's angle of attack and sideslip angle only on their respective pitch and sideslip axes, here indicia which are off the axes can also change appearance in dependence on the aircraft's angle of attack and sideslip angle, thereby allowing a pilot to more readily determine the state of the aircraft 100 when both the angle of attack and the sideslip angle are out of their datum ranges.

FIGS. 8-10 then illustrate alternative displays 800, 900, and 1000 using different types and numbers of indicia. Displays may use any suitable type and any suitable number of indicia, and some or all of the indicia of any one of the displays of FIGS. 3, 5, 6 and 8-10 may be replaced with some or all of the indicia of any other of the displays. Indicia need not be spaced apart as in the illustrated displays, and could be presented contiguously (edge-to-edge) on a display. Indicia may be presented in different colors and with different emphases, e.g., the display datum could be presented in green, with succeeding indicia (representing greater angle of attack and/or sideslip angle) being presented in yellow (possibly with greater illumination intensity), and with further succeeding indicia (representing even greater angle of attack and/or sideslip angle) being presented in red (and possibly with even greater illumination intensity). In all cases, the display may illuminate (or otherwise change the appearance of) the indicium representing the aircraft's current angle of attack and sideslip angle, the datum indicium, and all indicia therebetween. Alternatively, the display might only illuminate (or otherwise change the appearance of) the indicium representing the aircraft's current angle of attack and sideslip angle. Transitions to greater angle of attack and/or sideslip angle may be accompanied by audio or tactile signals to the pilot as well.

Values for the angle of attack and sideslip angle values associated with each indicium may be stored in, or calculated by, a processor within or associated with the display (i.e., a microprocessor, application-specific integrated circuit, programmable logic device, or other programmed or programmable device or equivalent circuitry). The values need not be uniform for all aircraft, as critical angles of attack and critical sideslip angles vary with aircraft configuration, and they need not be static values for a given aircraft, and may (for example) be adjusted with the aircraft's air speed, configuration (e.g., adding flaps, extending landing gear, etc.), and/or other factors such that deviation from the display datum can indicate potentially problematic flight conditions.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims. In these claims, no element therein should be interpreted as a "means-plus-function" element or a "step-plus-function" element pursuant to 35 U.S.C. § 112(f) unless the words "means for" or "step for" are explicitly used in the particular element in question.

What is claimed is:

1. An aircraft angle of attack and sideslip indicator including a display wherein the appearance of the display changes:
   a. along a vertical display axis in dependence on an angle of attack signal representative of the angle of attack of an aircraft, and
   b. along a horizontal display axis in dependence on a sideslip signal representative of the sideslip angle of the aircraft.

2. The indicator of claim 1 wherein:
   a. the vertical and horizontal axes intersect on the display at a display datum,
   b. the appearance of the display changes along the vertical display axis at a vertical distance from the display datum, wherein the vertical distance is dependent on the magnitude of the angle of attack of the aircraft, and
   c. the appearance of the display changes along the horizontal display axis at a horizontal distance from the display datum, wherein the horizontal distance is dependent on the magnitude of the sideslip angle of the aircraft.

3. The indicator of claim 1 wherein:
   a. the vertical and horizontal axes intersect at a display datum representative of a state wherein the aircraft has:
      (1) a datum angle of attack, and
      (2) a datum sideslip angle,
   b. regions are arrayed in succession above and about the sides of the display datum,
   c. the regions change appearance in dependence on the angle of attack and sideslip signals, wherein:
      (1) greater deviation of the aircraft's angle of attack from the datum angle of attack results in a change in appearance of a region having greater vertical distance from the datum, and
      (2) greater deviation of the aircraft's sideslip angle from the datum sideslip angle results in a change of appearance of a region having greater horizontal distance from the datum.

4. The indicator of claim 1 wherein:
   a. the vertical and horizontal axes intersect at a display datum representative of a state wherein the aircraft has:
      (1) a datum angle of attack, and
      (2) a datum sideslip angle,
   b. a pitch region extends above the display datum along the vertical display axis, the pitch region being representative of a state wherein the aircraft's angle of attack is greater than the datum angle of attack,
   c. a left sideslip region extends to the right of the display datum along the horizontal display axis, the left sideslip region being representative of a left sideslip state wherein:
      (1) the aircraft's nose is situated leftwardly, and (2) the aircraft's tail is situated rightwardly,
versus the datum sideslip angle,
d. a right sideslip region extends to the left of the display datum along the horizontal display axis, the right sideslip region being representative of a right sideslip state wherein:
(1) the aircraft's nose is situated rightwardly, and
(2) the aircraft's tail is situated leftwardly, versus the datum sideslip angle,
wherein each region changes appearance upon a transition to the state represented by the region.

5. The indicator of claim 1 wherein:
a. the vertical and horizontal axes intersect at a datum indicium representing:
(1) a datum angle of attack for the aircraft, and
(2) a datum sideslip angle for the aircraft,
b. the vertical and horizontal axes each bear a series of discrete indicia, wherein:
(1) each successive indicium following the datum indicium in the series along the vertical display axis:
(a) corresponds to a successively greater range of angles of attack of the aircraft, and
(b) changes appearance in dependence on the angle of attack signal,
(2) each successive indicium following the datum indicium in the series along the horizontal display axis:
(a) corresponds to a successively greater range of sideslip angles of the aircraft, and
(b) changes appearance in dependence on the sideslip signal.

6. The indicator of claim 1 further including:
a. an angle of attack sensor situated on the aircraft, the angle of attack sensor being configured to generate the angle of attack signal, and
b. a sideslip sensor situated on the aircraft, the sideslip sensor being configured to generate the sideslip signal.

7. The indicator of claim 6 wherein each of the angle of attack sensor and the sideslip sensor is defined by one or more of:
a. a vane sensor, and
b. a pressure sensor.

8. An aircraft angle of attack and sideslip indicator having a display including:
a. a display datum representative of a state wherein an aircraft has:
(1) a datum angle of attack, and
(2) a datum sideslip angle,
b. a pitch region above the display datum, the pitch region being representative of a state wherein the aircraft's angle of attack is greater than the datum angle of attack,
c. a left sideslip region to the right of the display datum, the left sideslip region being representative of a state wherein the aircraft's sideslip angle is leftward with respect to the datum sideslip angle,
d. a right sideslip region to the left of the display datum, the right sideslip region being representative of a state wherein the aircraft's sideslip angle is rightward versus the datum sideslip angle,
wherein each region changes appearance upon a transition to the region's state.

9. The indicator of claim 8 wherein
a. each region includes an array of discrete indicia, each indicium representing both:
(1) a range of angles of attack of the aircraft, and
(2) a range of sideslip angles of the aircraft,
b. each indicium changes appearance upon the aircraft's attaining an angle of attack and a sideslip angle within the indicium' s range of angles of attack and its range of sideslip angles.

10. The indicator of claim 8 further including:
a. an angle of attack sensor situated on the aircraft, the angle of attack sensor being configured to generate an angle of attack signal representative of the aircraft's angle of attack, and
b. a sideslip sensor situated on the aircraft, the sideslip sensor being configured to generate a sideslip signal representative of the aircraft's sideslip angle,
wherein each region changes appearance in dependence on the angle of attack signal and the sideslip signal.

11. The indicator of claim 10 wherein:
a. the angle of attack sensor is defined by one of:
(1) a first vane sensor, and
(2) a first pressure sensor; and
b. the sideslip sensor is defined by one of:
(1) a second vane sensor, and
(2) a second pressure sensor.

12. An aircraft angle of attack and sideslip indicator including:
a. an angle of attack sensor configured to generate an aircraft angle of attack signal representative of the angle of attack of an aircraft, and
b. a sideslip sensor configured to generate an aircraft sideslip signal representative of the sideslip angle of the aircraft,
c. a display visually depicting:
(1) the angle of attack of the aircraft along a display pitch axis, wherein the depicted angle of attack is dependent on the aircraft angle of attack signal, and
(2) the sideslip angle of the aircraft along a display sideslip axis, wherein the depicted sideslip angle is dependent on the aircraft sideslip signal.

13. The indicator of claim 12 wherein:
a. the axes intersect on the display at a display datum,
b. the appearance of the display changes along the display pitch axis at a first distance from the display datum, wherein the first distance is dependent on the magnitude of the angle of attack signal, and
c. the appearance of the display changes along the display sideslip axis at a second distance from the display datum, wherein the second distance is dependent on the magnitude of the sideslip signal.

14. The indicator of claim 12 wherein:
a. the pitch and sideslip axes intersect at a display datum representative of a state wherein the aircraft has:
(1) a datum angle of attack, and
(2) a datum sideslip angle,
b. regions are arrayed in succession above and about the sides of the display datum,
c. the regions change appearance in dependence on the angle of attack and sideslip signals, wherein:
(1) greater deviation of the aircraft's angle of attack from the datum angle of attack results in a change in appearance of a region having greater distance from the datum along the display pitch axis, and
(2) greater deviation of the aircraft's sideslip angle from the datum sideslip angle results in a change of appearance of a region having greater distance from the datum along the display sideslip axis.

15. The indicator of claim 12 wherein:
a. the pitch and sideslip axes intersect at a display datum representative of a state wherein the aircraft has:
(1) a datum angle of attack, and (2) a datum sideslip angle,
b. a pitch region extends along the display pitch axis adjacent the display datum, the pitch region being representative of a state wherein the aircraft's angle of attack is greater than the datum angle of attack,
c. a first sideslip region extends along the display sideslip axis from a first side of the display datum, the first sideslip region being representative of a first sideslip state wherein:
   (1) the aircraft's nose is situated leftwardly, and
   (2) the aircraft's tail is situated rightwardly, versus the datum sideslip angle,
d. a second sideslip region extends along the display sideslip axis from a second side of the display datum, the second sideslip region being representative of a second sideslip state wherein:
   (1) the aircraft's nose is situated rightwardly, and
   (2) the aircraft's tail is situated leftwardly, versus the datum sideslip angle,
wherein each region changes appearance upon a transition to the state represented by the region.

16. The indicator of claim 12 wherein:
a. the axes intersect at a datum indicium representing:
   (1) a datum angle of attack for the aircraft, and
   (2) a datum sideslip angle for the aircraft,
b. the axes each bear a series of discrete indicia, wherein:
   (1) each successive indicium following the datum indicium in the series along the display pitch axis:
      (a) corresponds to a successively greater range of angles of attack of the aircraft, and
      (b) changes appearance in dependence on the angle of attack signal,
   (2) each successive indicium following the datum indicium in the series along the display sideslip axis:
      (a) corresponds to a successively greater range of sideslip angles of the aircraft, and
      (b) changes appearance in dependence on the sideslip signal.

17. The indicator of claim 12 wherein:
a. the angle of attack sensor is defined by one of:
   (1) a first vane sensor, and
   (2) a first pressure sensor; and
b. the sideslip sensor is defined by one of:
   (1) a second vane sensor, and
   (2) a second pressure sensor.

18. The indicator of claim 12 wherein:
a. the display pitch axis is a vertical axis of the display, and
b. The display sideslip axis is a horizontal axis of the display.

* * * * *